United States Patent
Berninger

(10) Patent No.: US 6,352,369 B1
(45) Date of Patent: Mar. 5, 2002

(54) WEARING RING FOR A CABLE GUIDANCE TUBE OF A ROBOT

(75) Inventor: Alwin Berninger, Augsburg (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/371,241

(22) Filed: Aug. 10, 1999

(30) Foreign Application Priority Data

Aug. 11, 1998 (DE) ..................... 298 14 418 U

(51) Int. Cl.[7] .............................................. F16C 33/04
(52) U.S. Cl. .................. 384/273; 384/297; 384/448
(58) Field of Search ................. 384/448, 297, 384/299, 300, 273, 295

(56) References Cited

U.S. PATENT DOCUMENTS

| 4,178,949 A | 12/1979 | Mazon, III |
| 4,986,575 A | 1/1991 | Braun |

FOREIGN PATENT DOCUMENTS

| DE | 88 14 906 U1 | 3/1989 |
| DE | 89 04 843 U1 | 10/1990 |
| EP | 0 233 417 A | 8/1987 |
| FR | 2 599 568 A | 12/1987 |

*Primary Examiner*—Lenard A. Footland
(74) *Attorney, Agent, or Firm*—McGlew and Tuttle, P.C.

(57) ABSTRACT

A wearing ring, particularly for protecting a cable guidance tube on a robot, characterized in that the wearing ring has two layers, whereof one coaxially surrounds the other.

16 Claims, 5 Drawing Sheets

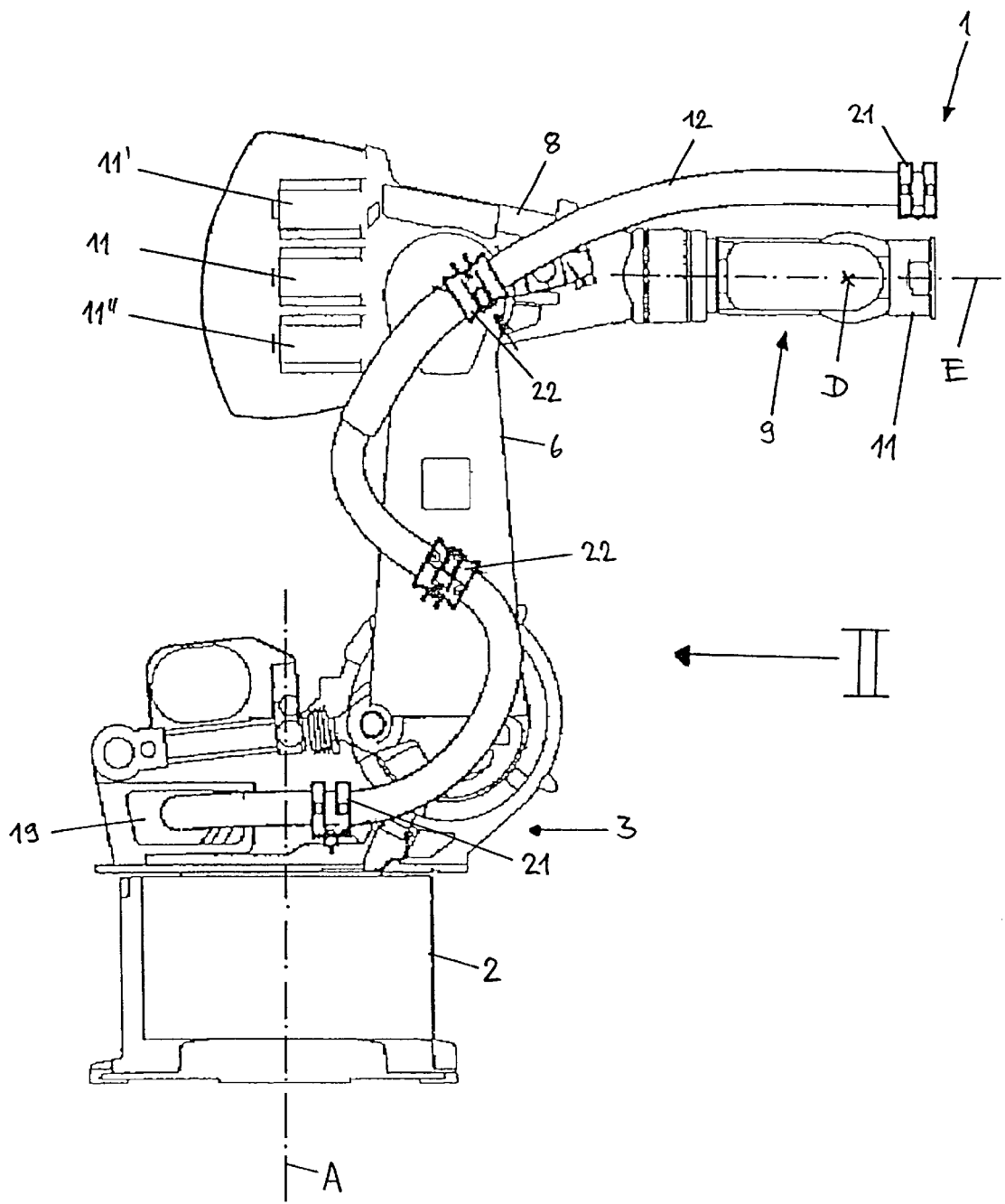
Figur 1

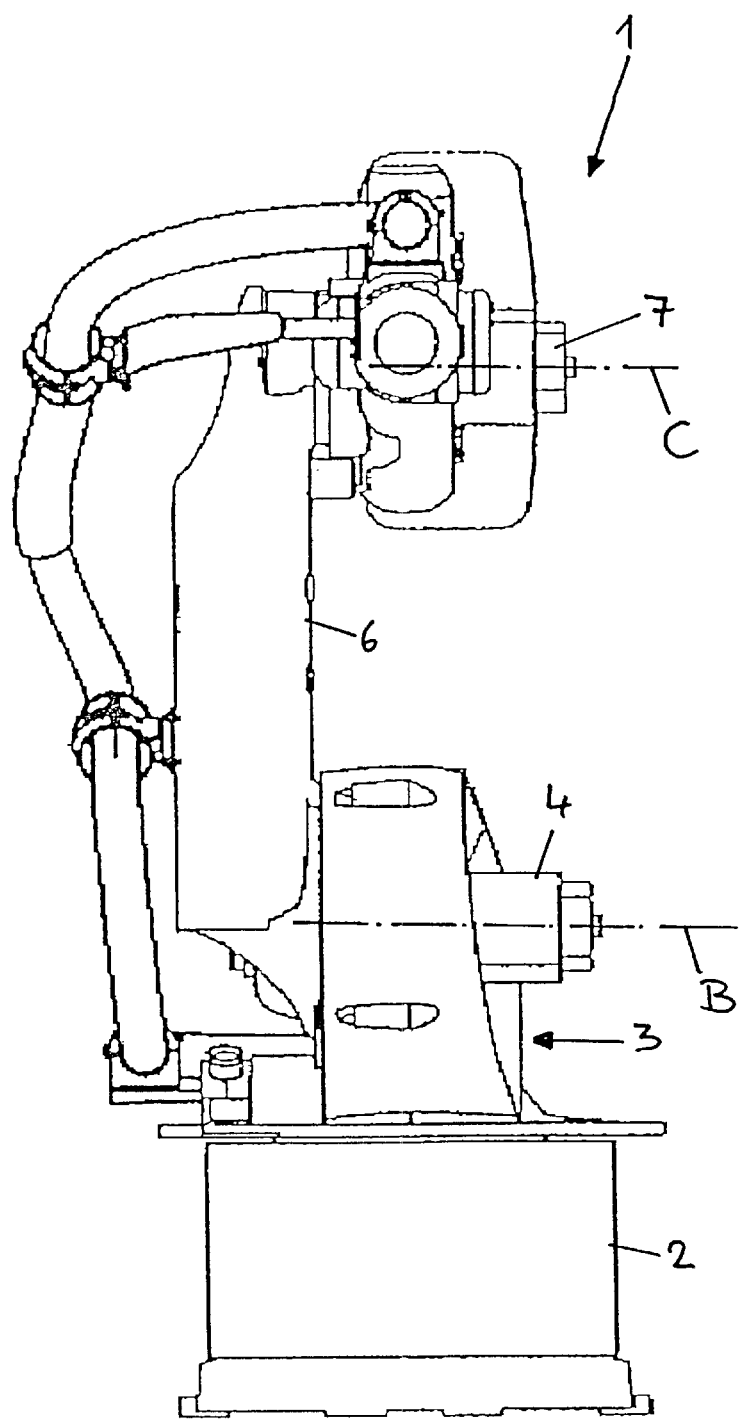
Figur 2

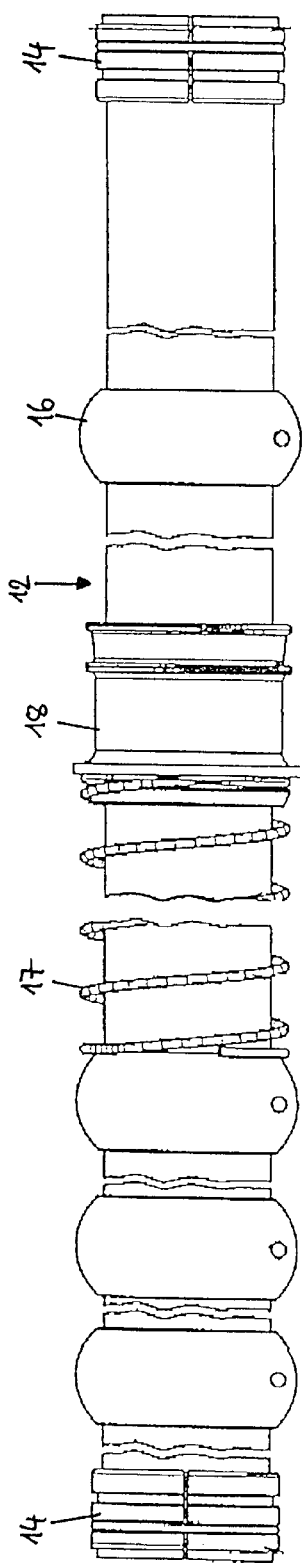
Figur 3
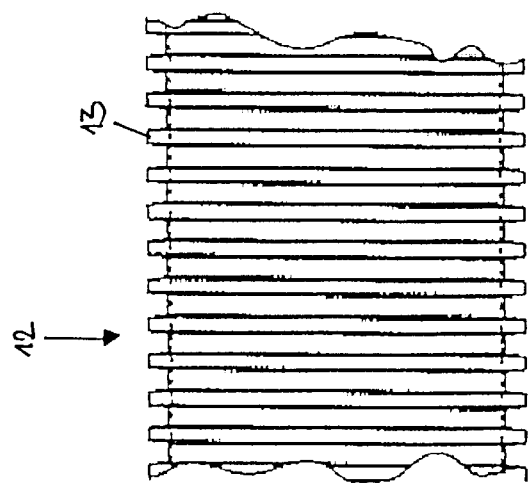
Figur 4

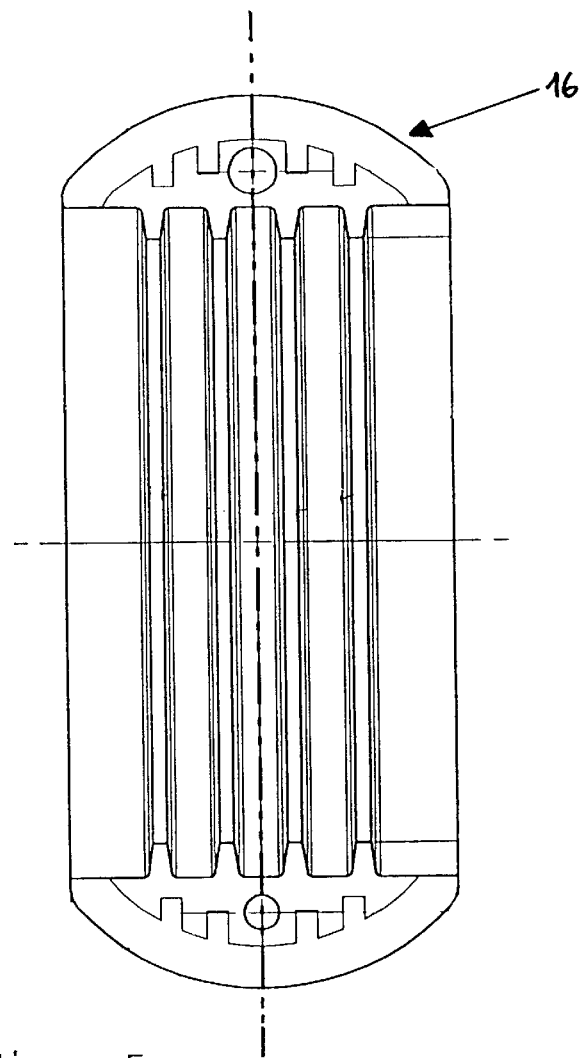
Figur 5
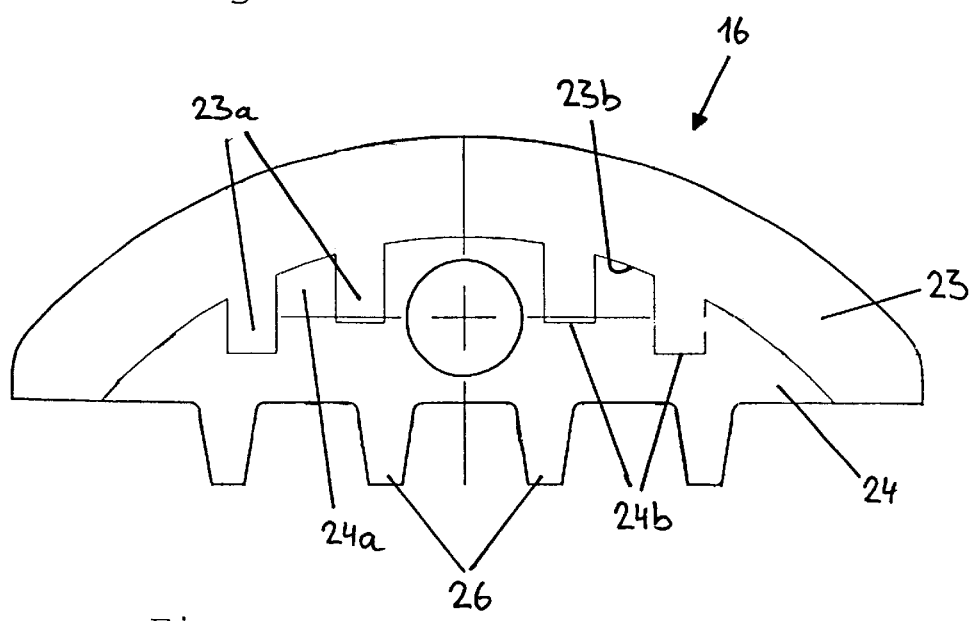
Figur 6

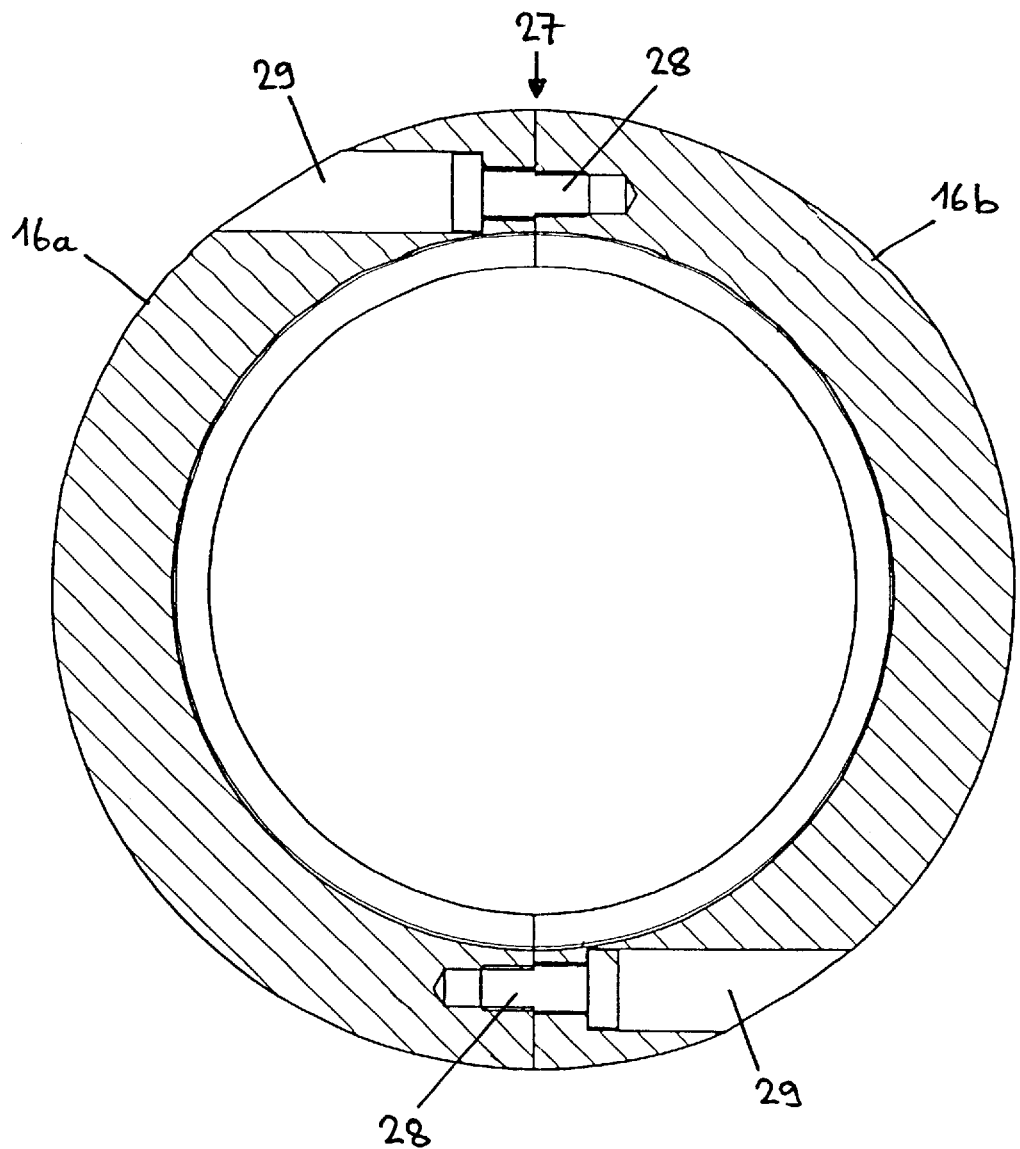
Figur 7

WEARING RING FOR A CABLE GUIDANCE TUBE OF A ROBOT

FIELD OF THE INVENTION

The invention relates to a wearing ring, particularly for protecting a cable guidance tube on a robot.

BACKGROUND OF THE INVENTION

Such wearing rings are positioned at critical points of a protective tube for cables on machines, particularly a robot, in order to prevent damage to the protective tube by rubbing or abrading at such critical points, such as points where it can contact moving robot parts, such as a rocker, arm or hand. As the wearing rings are located at critical points, they can themselves be worn away. This is often not frequently sufficiently well observed, so that the danger exists that following the wearing through of the wearing ring the protective tube is also damaged, especially if the wearing ring and tube has inconspicuous colours, particularly the same colouring.

The wearing rings generally comprise two half-shells, which are interconnected by metal screws. If the wearing ring is worn away in the vicinity of the screw fastening, then the countersunk screw heads appear and can then damage robot parts along which rub the wearing rings and therefore the projecting screw heads. Finally, frequently a one-piece tube is not desired and used and instead the protective tube consists of at least two parts, namely parts with different elasticity. They have to be interconnected by additional coupling sleeves, which increase costs.

SUMMARY OF THE INVENTION

Whilst avoiding the aforementioned disadvantages, the problem of the invention is to provide a wearing ring, which can in particular further reduce the risk of damage to the protective tube.

According to the invention, the set problem is solved by a wearing ring of the aforementioned type, which is characterized in that it has two layers, one of which coaxially surrounds the other.

As a result of the substantially coaxial layers of the wearing ring having different light absorption and therefore light reflection, i.e. different colours, after the wearing away of the outer layer, when then the lower layer is made visible by a different colour, it is easily possible to establish that the wearing ring has worn to such an extent that it must be replaced. The lower layer preferably has a reflecting power which is very noticeable, particularly e.g. bright red.

If, according to a preferred development, the layers engage in one another by means of ribs and grooves, it is easily possible to monitor the progression of the wearing of the wearing ring. As soon as the colour of the outer layer is no longer visible in the rib area thereof, the maximum wearing ring wear limit is reached. According to another preferred development, the outer layer, possibly with the exception of its ribs, has a constant, radial thickness. In particularly preferred manner, the layers are firmly interconnected and either the layers are firmly interconnected by a two-stage layer injection moulding process which welds together the layers or the layers are bonded together.

Alternatively, the layers may only be interconnected in frictionally engaging manner and in particular the layers are frictionally interlinked via their ribs and grooves.

For solving the inventive problem, in the case of a wearing ring it is also possible to provide it on its inside with at least four circumferential ribs. In that at least four ribs are provided on the inner circumference of the wearing ring, particularly on its inner layer, the latter can be used for connecting two tube parts, which are in each case held by means of two inner circumferential ribs of the wearing ring.

Then, advantageously, the wearing ring can be used as a coupling sleeve for two tube pieces, e.g. when using tube pieces having a differing elasticity.

For solving a further partial problem, the invention also provides for two half-shells forming the wearing ring to have an injection moulded inner thread and plastic screws engaging therein, the screws more particularly being made from polyamide. This obviates the use of metal parts for linking the two half-shells of the wearing ring, so that it is possible to prevent damage to robot parts rubbing along the wearing ring even when the plastics material has worn away to a significant extent, as disadvantageously occurs in the known wearing parts having metal screws.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 A robot in side view.

FIG. 2 The robot in front view corresponding to arrow II in FIG. 1.

FIG. 3 A protective tube for cables with its essential components.

FIG. 4 A larger-scale representation of a detail of the protective tube of FIG. 3.

FIG. 5 An axially parallel cross-section through an inventive wearing ring.

FIG. 6 A larger-scale partial representation of the object of FIG. 5.

FIG. 7 An axis-perpendicular cross-section along A—A through a wearing ring according to FIG. 5.

DESCRIPTION OF THE PREFERRED EMBODIMENTS

The robot 1 of FIG. 1 has a base 2 firmly connected to the ground and on which is located the robot base member 3 or "roundabout" rotatable around the vertical A-axis. With the latter a rocker 6 can pivot about the vertical B-axis by means of a motor 4. To its free end remote from the base 3 is provided a robot arm 8 pivotable with it about he horizontal C-axis by means of the motor 7. The arm 8 carries at its front, free end 9 a robot hand 11, which is in turn pivotable about at least one further, horizontal D-axis and the E-axis perpendicular thereto. The pivoting about the E-axis can take place through a drive motor 11 located at the rear end of the arm 8 by about the E-axis can take place through a drive motor 11 located at the rear end of the arm 8 by means of drive elements extending through said arm 8. Further movements of a complicated robot hand, such as a double angle hand or a tool can be brought about by further motors 11, 11' located at the rear end of the arm 8, once again by means of drive elements extending through said arm 8.

Both the motors and also the tools, such as e.g. a welding tool, must be supplied with power from the robot base 2.

This can take place through the robot elements (rocker, arm) or on the outside of the robot, which is in many cases more advantageous.

To protect the cables for a power supply to the motors and tools, they are surrounded by a protective tube 12, which is guided along the outside of the robot and fixed in punctiform manner thereto.

The protective tube 12 is provided with ribs 13. At its ends the tube is provided with end pieces 14. It can have wearing rings 16, as well as a compression spring 17, which bring it into a starting position on relieving with respect to the robot movement. A spring end holder 18 is provided as an abutment for the compression spring.

In the represented embodiment, the tube is fixed to the base 3 by a bulkhead 19, as well as well as over the tube length by clamp straps 31 and by means of tube holders 22.

The wearing rings 16 prevent a direct rubbing and therefore damage to the tube on moving robot parts, such as rocker 6, arm 8 and hand 11. The tube holder 22 supports and guides the tube 12 at one or more points on the robot arm 8 and rocker 6.

As can be gathered from FIGS. 5 and 6, the wearing rings 16 (FIG. 3) or the half-shells 16a, 16b forming the same (FIG. 7) in each case comprise two coaxial layers 23, 24 engaging in one another by means of ribs 23a, 24a and corresponding grooves 23b, 24b. The axial outer contour of the wearing ring is pitch circular. With the exception of the ribs 23a and in the vicinity of the grooves 23b, the radial thickness of the outer layer 23 is constant, whereas the thickness of the layer 24 changes in the axial direction and is determined by the pitch circular outer contour and the cylindrical passage of the wearing ring 16, with the exception of the ribs 26. The layers 23, 24 have a different colouring or in other words have a different optical absorption capacity or reflection capacity, this or the colour of the inner layer 24 being chosen in such a way that there is a clear contrast with respect to the absorption capacity or colour of the outer layer 23 and the inner layer has a bright colour, particularly red.

The two layers 23, 24 need only be interconnected in frictionally engaging manner by means of the ribs and grooves 23a, 23b, 24a, 24b. Alternatively they can be bonded together. As the ring is made from plastic they can also be welded together. They can also be jointly produced in a two-stage injection moulding process, in that firstly one part, particularly the layer 24 is injection moulded in an injection mould and then the layer 23 is moulded round the layer 24.

On the substantially cylindrical inner wall of its layer 24, the wearing ring 16 has four inwardly projecting ribs 26 with which the wearing part 16 engages in grooves (FIG. 4) provided between the ribs 13 of the tube 12 and is so axially fixed to said tube 12 that the wearing part 16 cannot slide along the tube and modify its axial position. The four ribs 26 also make it possible, in the vicinity of the wearing ring 16 to interconnect by means of their ribs two ribbed tube pieces, e.g. having different elasticity, so that the wearing ring 16 serves as a coupling sleeve for the two tube pieces.

As has been stated, the wearing rings 16 comprise two semicircular halves 16a, 16b, which, accompanied by the interposing of the tube 12 for forming the wearing ring 16, are placed against one another and surround the tube and are interconnected in the vicinity of their end walls 27. In the wearing ring according to the invention this is brought about by polyamide cylinder head screws 28, which are inserted in a depression 29 of the half-shell 16a, are passed with the screw portion through a bore of the half-shell 16a and screwed into an injection moulded inner thread of the other half-shell 16b and vice versa for the screw 28 projecting in the lower area of FIG. 7 from half-shell 16b to half-shell 16a.

While specific embodiments of the invention have been shown and described in detail to illustrate the application of the principles of the invention, it will be understood that the invention may be embodied otherwise without departing from such principles.

What is claimed is:

1. Wearing ring for protecting a cable guidance tube on a robot, the wearing ring comprising:
    two radially arranged layers with each layer forming a completely closed ring, whereof one said layer coaxially surrounds the other layer and said layers are firmly interconnected, said layers being one of welded and bonded together.

2. Wearing ring according to claim 1, wherein: said layers engage in one another by means of ribs and grooves.

3. Wearing ring according to claim 2, wherein: said outer layer has a constant radial thickness except for its ribs.

4. Wearing ring according to claim 1, wherein: said layers are firmly interconnected by a two-stage layer injection molding process.

5. Wearing ring according to claim 1, wherein: an inside one of said layers has on its inside surface at least four circumferential ribs.

6. Wearing ring according to claim 1, wherein: two half-shells form said layers, said half-shells have injection molded inner threads and plastic screws engaging therein.

7. Wearing ring according to claim 6, wherein: said screws are made from polyamide.

8. A wearing ring arrangement comprising:
    a first layer forming a closed collar with an inner wall positionable around a protective tube;
    a second layer attached to a radial outside of said first layer and forming a closed collar coaxial with said first layer;
    ribs extending from said inner wall of said first layer;
    a protective tube arranged inside said closed collar of said first layer, said protective tube including ribs engaging with said ribs of said first layer.

9. An arrangement in accordance with claim 8, wherein: said inner wall is substantially cylindrical.

10. An arrangement in accordance with claim 8, further comprising:
    another protective tube arranged inside said closed collar of said first layer, said another protective tube including ribs engaging with said ribs of said first layer.

11. An arrangement in accordance with claim 8, wherein: a radial distance between a radial inner and outer surface of said second layer is substantially constant.

12. A wearing ring arrangement comprising:
    a first layer forming a closed collar with an inner wall positionable around a protective tube;
    a second layer attached to a radial outside of said first layer and forming a closed collar coaxial with said first layer;
    said first and second layers having different colors.

13. A wearing ring arrangement comprising:
    a first layer forming a closed collar with an inner wall positionable around a protective tube;
    a second layer attached to a radial outside of said first layer and forming a closed collar coaxial with said first layer;

said first and second layers being formed by first and second half-shells.

14. An arrangement in accordance with claim 13, wherein:

said first and second half shells are substantially identical.

15. Wearing ring for protecting a cable guidance tube on a robot, the wearing ring comprising:

two radially arranged layers with each layer forming a completely closed ring whereof one said layer coaxially surrounds the other layer, said layers being formed by two half-shells, said half-shells having injection molded inner threads and plastic screws engaging therein.

16. A wearing ring arrangement comprising:

a first layer forming a closed collar with an inner wall positionable around a protective tube;

a second layer attached to a radial outside of said first layer and forming a closed collar coaxial with said first layer, a radial distance between a radial inner and outer surface of said second layer is substantially constant.

* * * * *